United States Patent [19]
Raposo

[11] 4,280,480
[45] Jul. 28, 1981

[54] SOLAR HEATING PLANT

[76] Inventor: Sulpicio B. Raposo, P.O. Box 888, Frankfort, Ky. 40602

[21] Appl. No.: 130,837

[22] Filed: Mar. 17, 1980

[51] Int. Cl.$^3$ .............................................. F24J 3/02
[52] U.S. Cl. .................................. 126/429; 126/430; 126/436; 126/439; 126/441
[58] Field of Search ............... 126/438, 439, 430, 436, 126/437, 435, 441, 450, 429

[56] References Cited

U.S. PATENT DOCUMENTS

| | | | |
|---|---|---|---|
| 3,236,294 | 2/1966 | Thomason | 126/430 |
| 3,412,728 | 11/1968 | Thomason | 126/430 |
| 4,037,583 | 7/1977 | Bakun | 126/430 |
| 4,056,313 | 11/1977 | Arbogast | 126/438 |
| 4,059,226 | 11/1977 | Atkinson | 126/430 |
| 4,132,219 | 1/1979 | Cohen | 126/438 |
| 4,173,304 | 11/1979 | Johnson | 126/430 |
| 4,183,350 | 1/1980 | Staudacher | 126/430 |
| 4,184,482 | 1/1980 | Cohen | 126/438 |
| 4,209,222 | 6/1980 | Posnansky | 126/438 |
| 4,233,961 | 11/1980 | Kelly | 126/430 |

*Primary Examiner*—Daniel J. O'Connor

[57] ABSTRACT

A simple solar heating plant comprising multiple reflectors, primary and secondary compartments, an air heating assembly and a concealed solar heat collector being formed and constructed in an enclosed shed. The shed is provided with a single entrance for access, and a skylight for sun rays to enter. The shed may be attached to an existing house or built adjacent to the house with connecting ductwork. In a new proposed building a leanto to accommodate the elements of the plant may be designed and constructed on one side of the building favorable to the varying position of the sun. Tight air space between the walls of the compartments and the inner wall of the shed is provided to reduce the effect of cold air conduction from the outside. The primary compartment of the plant is provided with a clear glass cover or equivalent to allow sun rays to be directed to the collector positioned on the leveled surface of piled rocks or bricks within the compartment. The solar heat collector formed by double layers of looped tubing, with aluminum or copper grits filled to the level of the upper loop, transmits heat to piled rocks or bricks through conduction, radiation and convection. Heat stored in piled rocks or bricks is then conducted and radiated to an air heating assembly through which an air stream coming from air return duct is heated. Water heating is accomplished by forming a coil of water conduit in the secondary compartment where water is preheated and connected to another coil in the primary compartment where main heating occurs. Water is heated as it passes through the hot coil which absorbs heat through contact with heated rocks or bricks and hot air confined in the compartment.

11 Claims, 10 Drawing Figures

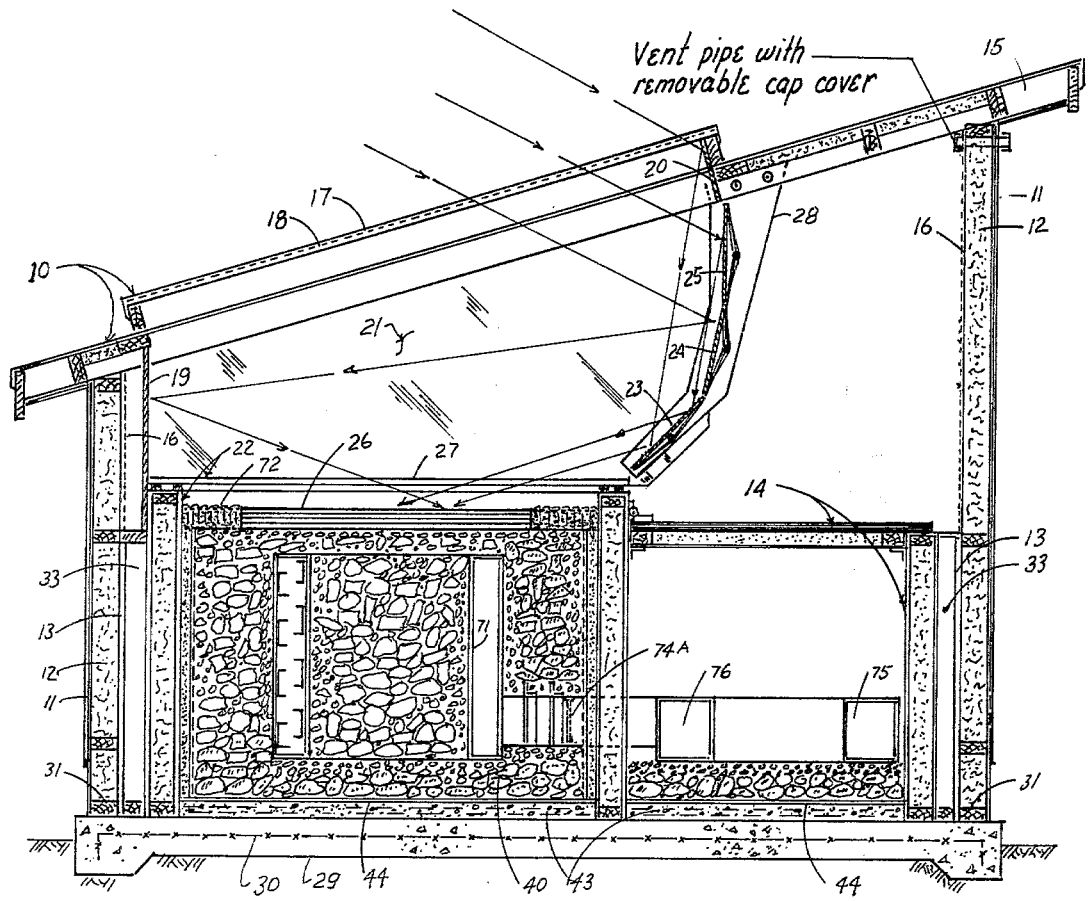
Fig. 1
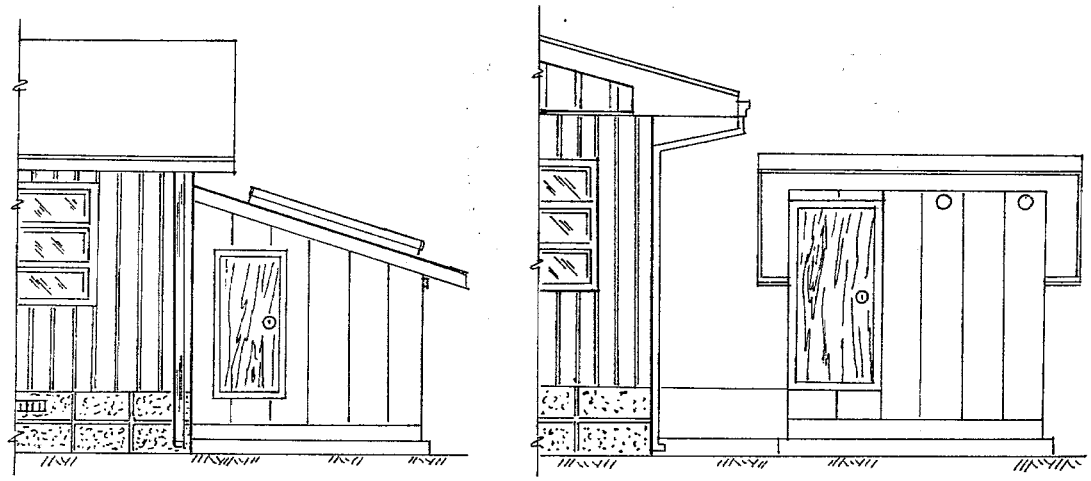
Fig. 2
Fig. 3

SOLAR HEATING PLANT

BACKGROUND OF THE INVENTION

This invention relates to a simple solar heating plant intended for water heating and heating of residential homes in particular, but is also applicable when modified, to other type of building structures and systems where hot air stream or fluid is needed. Heat collection in this invention is effectively improved through the use of multiple reflectors and a concealed solar heat collector not affected by chill temperature during winter season. Concentration of sun rays directly received from the sun and sun rays deflected through the multiple fixed and adjustable reflectors installed within the shed maximize heat buildup in the collector in shorter time. Heat is transmitted from the collector to piled rocks or bricks stored in the primary compartment of the plant through radiation and conduction. Additional heat is transmitted to piled rocks or bricks through a double coil of conduit through which hot fluid circulates from the collector to the coil and back to the collector by means of pressure heat buildup in the collector. Air stream flowing through the air heating assembly of the plant is then heated and circulated to the house by a blower or suction fan thermostatically controlled, which may be installed within an air duct in the crawl space or basement of the house. Water heating is formed by coiling a water conduit in the secondary compartment where water is preheated and connected to another coil mounted around the inner peripheral wall of the primary compartment where final heating occurs. The coil obtains heat through contact with heated rocks or bricks and confined hot air within the said compartment.

This invention utilizes commercially available materials mostly found in hardware and lumberyard stores and does not require any electrical gadget within the plant. A simple yet effective improvement of collecting heat from the sun, even on winter season, enables the plant instantly to replace used heat when the sun shines, due to the fact that the plant has multiple reflectors and none of the heat collector's part is exposed to chill temperature.

SUMMARY OF THE INVENTION

It is the prime object of the present invention to collect solar energy for home heating purposes in a much simpler, yet effective way of collecting and storing heat, utilizing commonly available commercial materials and affording those not familiar with the art, especially the low income family, to build the invention with minimal consultation from the experts and professionals familiar with the construction of the present invention.

Additional objects of this invention, are (1) to collect solar energy at least from morning to afternoon sunlight at all seasons of the year, (2) to buildup heat in the heat collector in shorter time, (3) to readily replace used heat in the plant's storage for a full sunshine day, (4) to use commonly available and inexpensive commercial materials, and (5) to supplement the existing home heating generator, in order to cut down considerably steadily rising cost of home heating.

The above mentioned objectives of the present invention are attained (1) by forming a substantially air tight shed to house all the components of the solar heating plant and to protect the heating system of the plant from chill temperature, thus making it possible for the plant to collect and store heat at all seasons of the year as long as the sun shines favorably, (2) by using multiple reflectors to increase and concentrate the amount of sun rays directed to the heat collector, (3) by further concealing the heat collector inside the primary compartment allowing concentration of sun rays to enter the compartment through the clear glass cover, thus building heat in the collector in shorter time and permitting escape of excessive heat buildup in the collector to be conducted and radiated to piled rocks or bricks directly below the collector, (4) by transferring additional heat to piled rocks or bricks by convection through the tubing coiled through the piled rocks or bricks through which hot fluid circulates from the collector then to the tubing coils and back to the collector by means of pressure heat buildup in the collector, (5) by forming an air heating assembly encased in piled rocks or bricks for the purpose of absorbing heat confined in the primary compartment and for heating the air stream flowing through the assembly, and finally, (6) by constructing two connecting compartments, the walls may be formed of masonry units, bricks, or fabricated of heavy gage sheeting or constructed of construction grade lumbers and heavy gage aluminum or galvanized sheetings or the like with fiber insulation placed between horizontal and vertical supporting members to minimize loss of heat through the double walls of the said compartments.

The aforementioned objects together with the apparent objects and advantages as shown and illustrated from the standpoint of the drawings and ensuing descriptions thereof, provide flexibility to the present invention in various construction techniques which may comprise combination or arrangement of various parts and elements as defined in the embodiments and claims appended herewith.

DESCRIPTION OF THE DRAWINGS

FIG. 1 is a sectional view showing the major elements of the solar heating plant, the reflectors, the heat collector and the air heating assembly inside the primary compartment, the air return and air supply ducts in the secondary compartment and an air duct with swing type shutter connecting the air heating assembly and the air return duct.

FIG. 2 is an elevation view of the plant attached to the side of the residential house.

FIG. 3 is another view of the plant built adjacent to the residential house showing a ductwork connecting the plant and the house.

DESCRIPTION OF THE PREFERRED EMBODIMENTS

Figure 4:
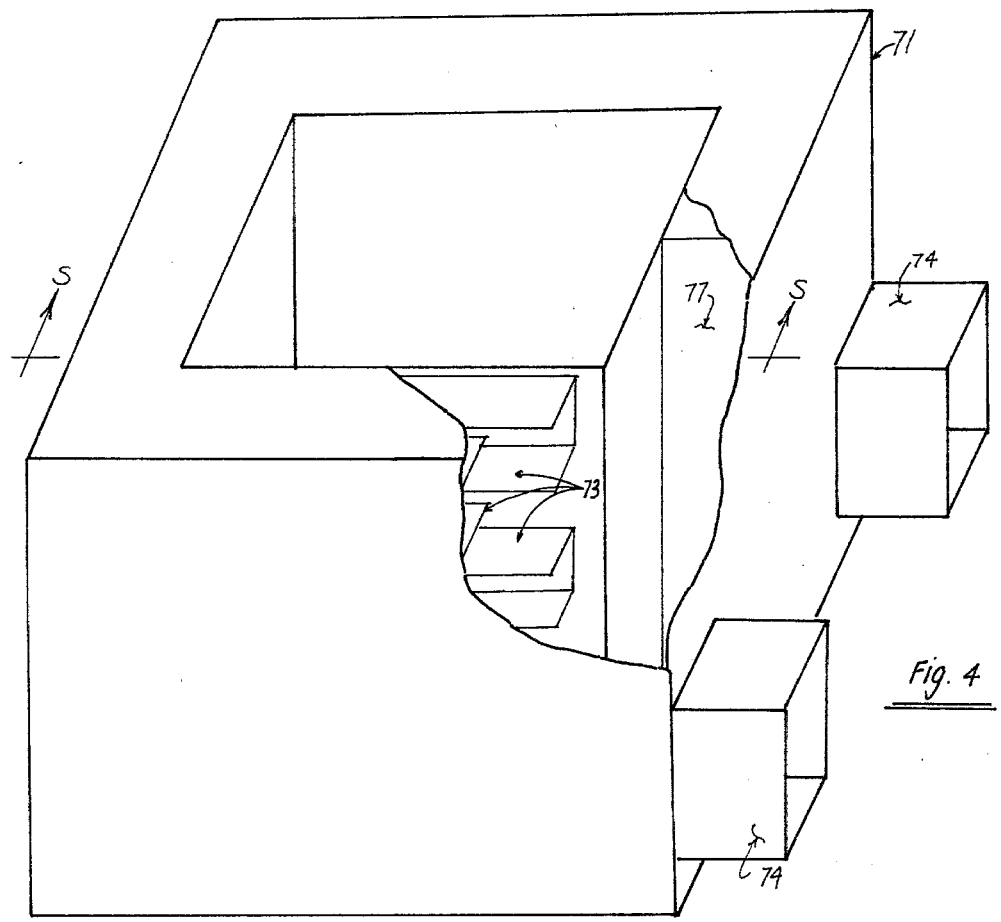
FIG. 4 is a three dimensional view of the air heating assembly showing partly the U-shape bent plate inside the assembly and two stubbed ducts on one side to receive connecting ducts from air supply and air return ducts.

According to the present invention as illustrated in FIG. 1, the major elements of the solar heating plant are protected by a substantially air tight, shed 10, the walls may be constructed of reinforced concrete, masonry units, bricks, plain or cellular metal or combination thereof, but for simplicity and economic reason are preferably constructed of exterior type plywood 11, or equivalent, and construction grade lumber framework. The exterior side of the wall 11 is painted with dark non-reflective color. Blanket of fiber insulation 12, placed between the horizontal and the vertical members of the framework is enclosed by a double wall 13, may be a dry wall or plywood, up to the top level of the secondary compartment 14, and from there on to the bottom side of the rafter 15, is a mesh wire or expanded metal 16, indicated by broken lines. The mesh wire 16, permits the escape of heat stored in the fiber insulation 12, at night and on cool days, to maintain warm space within the plant and prevent frost or light snow accumulation on the sky light 17, which may be made of clear glass or any commercial clear thermoplastic supported by mesh wire 18, with an opening not smaller than one inch square nor larger than one inch by two inches. Four fixed reflectors 19, 20 and 21 are placed face to face on opposite sides of the primary compartment 22, in addition to adjustable reflectors 23, 24 and 25, which can be of ordinary glass mirror, or a highly reflective aluminized or plated metal, and enable the plant to reflect sufficient sun rays to collector 26 placed just below the glass cover 27, of the primary compartment 22. The adjustable reflectors 23, 24 and 25 may be constructed in many conventional ways. The two main supporting panels 28, may be made of plywood, metal or any known suitable material, cut to a desired shape in such a way to suit the desired angle of placement of individual reflecting panel. The adjustable reflectors 23, 24 and 25 are not limited to three panels as shown in FIG. 1 of this invention, as it can be reduced to two panels or increased to more than three panels depending on the size of the shed 10, and pitch of its roof. The detail of the adjustable reflectors 23, 24 and 25 shown in FIG. 1 merely exemplifies a simple view that can give an idea even to those who are not familiar with the art.

Figure 9:
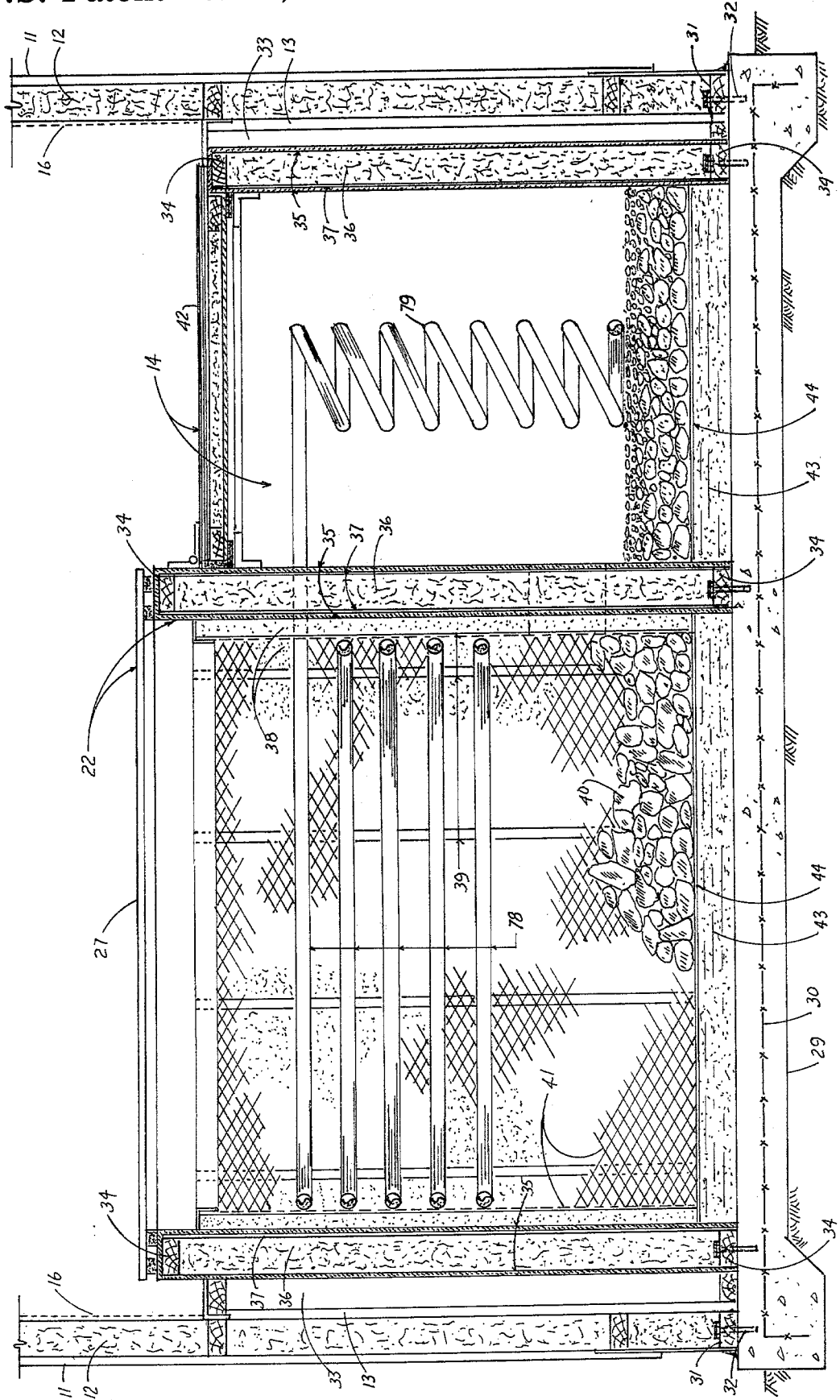
FIG. 9 is an enlarged sectional view of the primary and secondary compartments, showing the coil of water conduit in both compartment and the major elements and details of the shed and the compartment's wall.

The shed 10 may roofed with black shingles, but preferably with sheet metal painted black or dark green or any dark non-reflective color, the underside of which is covered with fiber insulation. The foundation 29 shall be of reinforced concrete with at least welded wire fabric 30 as reinforcement. As indicated in FIG. 9, the bottom horizontal member 31 of the wall framework, is anchored to the foundation 29 in a conventional manner utilizing any commercial drill in expansion bolt 32 so spaced apart to give sufficient stability to shed 10. An air tight space 33 is formed around the exterior walls of the primary compartment 22 and the secondary compartment 14 to reduce conduction of cold air coming from the outside to the interior space of the primary compartment 22 and secondary compartment 14. The walls of the compartments as shown in FIG. 9, may be constructed of bricks, masonry units, reinforced concrete or fabricated of lightweight hollow or cellular metal, but in this invention to afford the low income to build one shall be formed of construction grade lumbers 34 and heavy gage metal 35 with fiber insulation 36, placed in spaces between vertical and horizontal members. A strip of non-combustible layer 37 such as asbestos or the like, is placed between the faces of the construction grade lumber and the heavy gage metal 35. Referring further to FIG. 9, a blanket of fiber insulation 38 is laid around the outside face of the inner wall of the primary compartment 22 between vertical bars 39, conveniently spaced apart, which can be of any convenient shaped metal bars. The blanket of fiber insulation 38 which serves to minimize loss of stored heat through the walls of the said compartment, is protected from deforming against piled rocks or bricks 40, by netted wire 41, which can be a mesh wire, expanded metal, perforated metal sheeting, or equivalent.

The secondary compartment 14, where preheating of the air stream and water occurs prior to entering the primary compartment 22, is constructed similar to that of the primary compartment except that a shutter 42, is provided which can be a cellular metal, double wall metal sheeting or double wall plywood or combination thereof. The space between said double wall is filled with porous insulation. Blanket of fiber insulation around the face of the inner wall of said compartment is optional. A layer of clay soil 43, which can be substituted for sand or a mixture of clay and sand is placed on the floor of the primary and secondary compartments, above which is a heavy gage metal 44, placed between layer of clay soil 43 and piled rocks or bricks 40. The clay soil 43, serves as cushion and as an insulation to provide uniform bearing pressure and minimized cracking effect to the concrete floor 29.

Figure 6:
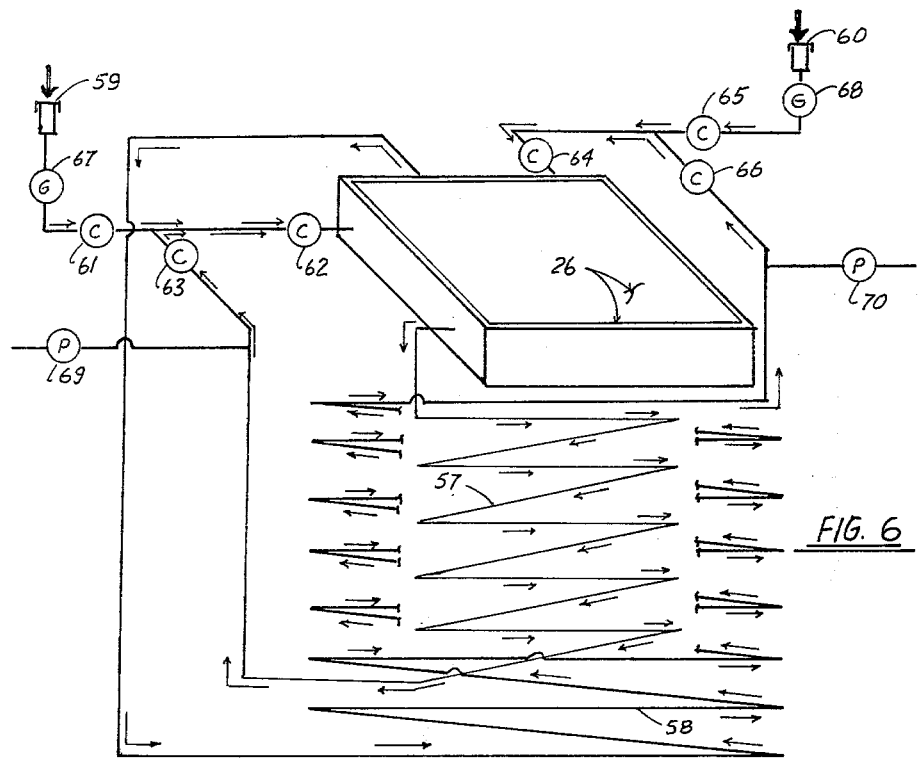
FIG. 6 is a schematic view of the collector and the coil of tubing indicating the flow of the fluid from an inlet terminal to the collector to the coil and back to the collector.
Figure 7:
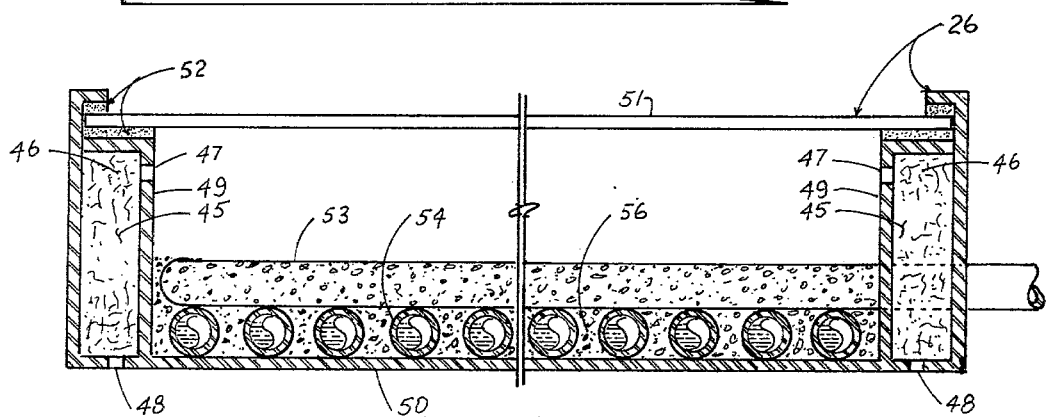
FIG. 7 is a sectional view of the solar heat collector.
Figure 8:
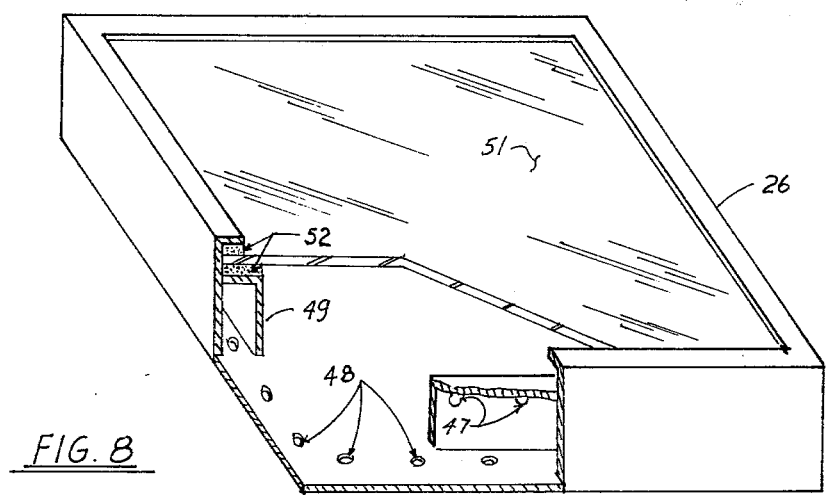
FIG. 8 is a three dimensional view of the collector without the double layer of looped tubing, the clear glass cover partly cut.
Figure 10:
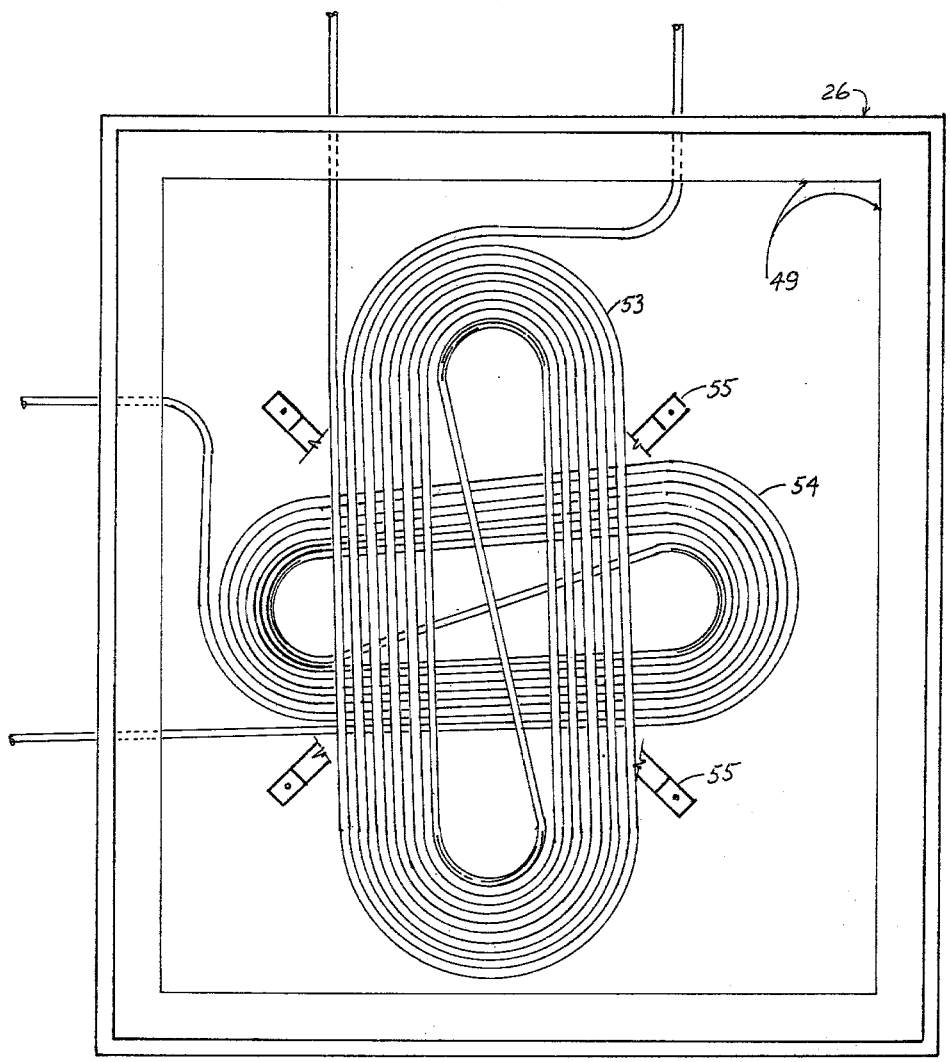
FIG. 10 is a plan view of the collector showing the double layers of looped tubing starting from letter "S" shape loop.

FIGS. 7, 8 and 10 show the detailed construction of the solar heat collector 26. The main body of the solar heat collector 26, may be fabricated of heavy gage aluminum sheeting, galvanized sheeting or the like, forming a pan with a hollow space 45, provided around the inside face of the pan. The space 45 is filled with a porous insulation 46 which can be of any commercial fiberglass insulation or the like. Perforated holes 47 and 48 at the inner walls 49 and bottom plate 50 of the solar heat collector 26, provide escape outlets for the excessive heat wave builtup within the collector 26 to be stored and retained in piled rocks or bricks 40, directly below the solar heat collector 26. Escape of hot air wave within the solar heat collector 26 through the corners and sides of the clear glass cover 51, is inhibited by two heat resistant strips 52, which can be of asbestos fiber or any known commercial non-combustible weather stripping. As illustrated in FIGS. 7 and 10, the double layers of looped tubing 53 and 54 are positioned in such a way that one loop is over the other and the tubing secured against lateral movement by heavy gage metal strap 55 which can be of aluminum, copper or ordinary metal, painted black with a commonly available high temperature paint. The said straps may be attached to the back wall 50 or to the inner walls 49 of the solar heat collector 26. FIG. 10 merely exemplifies a simple view of the looping technique of the tube. The more loops are made within the space of the solar heat collector 26, the better. The number of layers of looped tubing can be less or more than two as desired. Spaces between loops of flexible tubes are filled with aluminum or copper grits 56 up to the level of the upper layer of tubing. In the absence of aluminum or copper grits, commercial silicone sand or washed beach sand can be substituted. The top surface of the looped tubing 53 and the leveled surface of the aluminum or copper grits 56, is painted black to readily absorb the heat energy from the sun rays deflected to the solar heat collector 26. The inlet and outlet conduits of the solar heat collector 26, are connected to tubing coils 57 and 58 best shown in FIG. 6 and FIG. 5. As indicated in FIG. 6, the flow of the fluid through the tubing system, starting from inlet terminals 59 and 60, to the solar heat collector 26, where the fluid is heated and circulated to the coils 57 and 58 by heat pressure buildup in the solar heat collector 26, is inhibited from flowing back by swing-type check valves 61, 62, 63, 64, 65 and 66.

Hot fluid circulating through tubing coils 57 and 58, transmits additional heat to piled rocks or bricks 40, in addition to conducted and radiated heat from the bottom surface of the solar heat collector 26. Gate valves 67 and 68 in the schematic illustration of FIG. 6, serve to ensure no back flow of hot fluid when valves 67 and 68 are closed, to inlet terminals 59 and 60. Relief pressure-temperature valves 69 and 70 are provided to release excessively high pressure buildup within the tubing system. Advantages of tubing coils 57 and 58 are obviously seen from the standpoint of the drawings shown in FIGS. 5 and 6. Hot fluid circulating through the coils 57 and 58 distributes heat evenly to piled rocks or bricks 40 within the primary compartment 22 and likewise radiates heat to air heating assembly 71. Referring back to FIG. 1, heat stored and retained in piled rocks or bricks 40, is blocked from escaping upward through the clear glass cover 27, by the solar heat collector 26 and by a blanket of dense fiber insulation 72 placed around the said solar heat collector.

Figure 5:
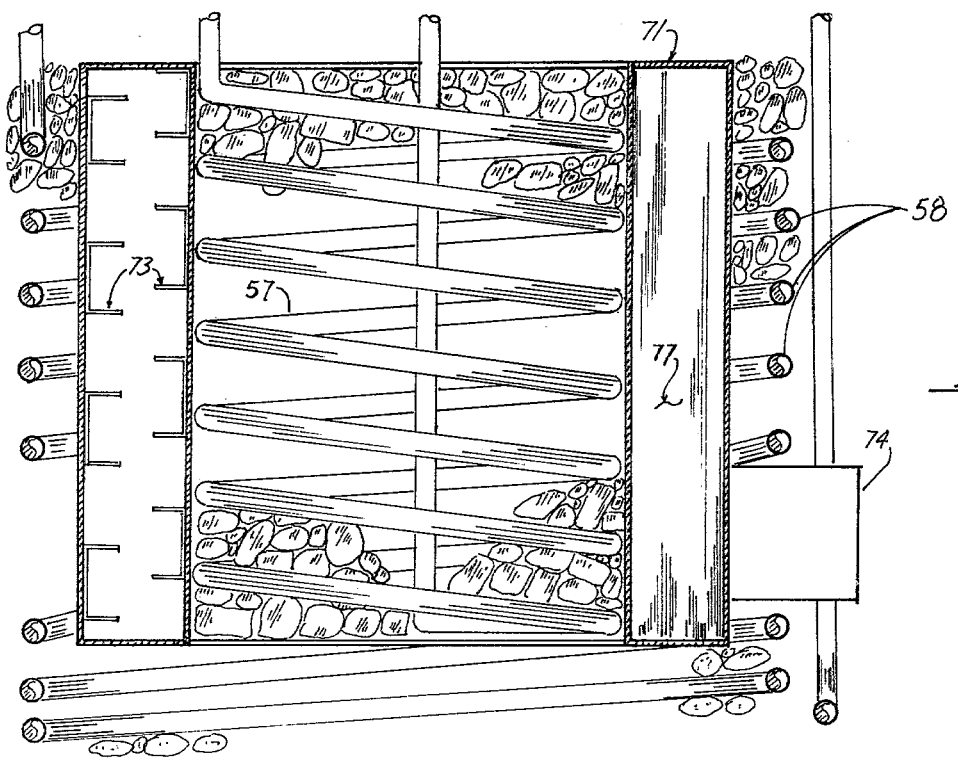
FIG. 5 is a sectional view along line S—S of FIG. 4 showing the cross section of the U-shape bent plate inside the assembly. It shows further when the assembly is fully encased in piled rocks or bricks with double coil of tubing coming from the collector, as illustrated further in FIG. 6.

An air heating assembly 71, shown in FIG. 1 and further illustrated in FIGS. 4 and 5, can be fabricated of heavy gage aluminum sheet or galvanized sheet metal, the outside wall surface of which is painted with commercially available high temperature paint. The U-shape bent plates 73, arranged conveniently in staggered spacing inside the three sides of the air heating assembly 71, is preferably made of metal similar to the main body of said assembly 71, to avoid galvanic action. The U-shape bent plates 73, serve as stiffener of the assembly's wall, retain the drawn heat from the piled rocks or bricks 40 inside the assembly and act as intensifier in the transfer of heat to air stream flowing through the assembly. The assembly's two stubbed ducts 74, shown in FIGS. 4 and 5, are to receive connecting ducts coming from air return duct 75 and hot air supply duct 76 as indicated in FIG. 1. The connecting ducts are provided with swing type shutter 74A, to prevent backflow of air streams. The air heating assembly 71, which may comprise of any number of convenient sides, can be a four sided polygon as shown in FIG. 4, five sided or more, or can be a semi or a full cylindrical structure, achieving the same function and object as depicted in the present invention. Regardless of the shape of the air heating assembly 71, a blocking wall 77, in FIGS. 4 and 5, of the same material as said assembly must be provided to ensure that air stream coming from air return duct 75 flows around the assembly before returning to hot air supply duct 76 as illustrated in FIG. 1.

Water heating can be formed by installing a coil of tubing 78, as shown in FIG. 9, which can be of any metallic tube but preferably a flexible copper conduit, coiled around the inside periphery of the primary compartment 22, at a convenient spacing to afford the said tubing coil. It draws heat effectively from piled rocks or bricks 40 and from hot air confined within the primary compartment. The tubing coil 78 is then connected to another coil 79 in the secondary compartment 14, where water is preheated before passing through tubing coil 78 where the main process of water heating occurs.

The aforementioned descriptions and illustrations of the various elements of the invention should not be construed as a limitation to the scope of the invention but as an exemplification of the embodiments which can be embodied in other modified structures, wherein all the minor and major modifications or equivalents may be classified to be falling within the scope of the present invention.

What is claimed is as follows:
1. A solar plant, comprising of:
   a. multiple reflectors composed of fixed and adjustable highly reflective panels so arranged to catch low and high angle rays of sunlight, wherein the fixed reflectors are placed vertically on the top cover of a primary compartment along the border of the compartment's three sides, the adjustable reflectors suspended from the rafters of a shed, whereby each individual reflecting panel is positioned at a convenient angle with the vertical plane to catch and pitch sun rays at various angles;
   b. a primary compartment to house the air heating assembly, including piled rocks or bricks, a solar heat collector and tubing coils for water heating, and having means to likewise confine hot air for transfer of heat energy to an air heating assembly and a coil of water conduit;
   c. a secondary compartment for storing some of the escaped heat from the primary compartment, said heat used to preheat an air stream flowing through an air return duct and water passing through a tubing coil housed in said compartment;
   d. a solar heat collector concealed in the primary compartment positioned on top of piled rocks or bricks having a double layer of looped conduit, the said loop starting from the letter "S" shape and spaces between looped tubing filled with aluminum or copper grits;
   e. an air heating assembly encased in piled rocks or bricks in the primary compartment, wherein the said assembly draws heat from piled rocks or bricks and confined hot air within said compartment and transfers retained heat to an air stream flowing through the said assembly;
   f. a looped water conduit coiled in the secondary compartment and around the inner peripheral wall of the primary compartment, wherein the said water conduit draws heat through contact with piled rocks or bricks and hot air confined in said compartment; and
   g. a relatively air tight shed to house and protect the elements of the solar plant from influence of chill temperature, the said shed provided with skylight, single entrance with air tight shutter and short vent pipes with removable cap cover through the back or front wall of said shed for releasing excessive hot air within said shed during summer time.

2. The solar heat collector defined in claim 1, wherein the outer and inner walls formed a space around the main body of the collector, the said space is filled with a porous fiber insulation to allow slow passage of hot air coming from perforation provided on inner walls and going out to perforated holes at the bottom side of said collector.

3. The solar heat collector defined in claims 1 or 2, wherein the inlet and outlet ends of the double layer looped tubing are connected to flexible tubing coiled around the outside periphery of the air heating assembly's outer and inner walls, the said coils are provided with swing type check valves to ensure one directional flow of fluid from the inlet terminals to the collector then to the coil and back to the collector, and further provided with pressure-temperature relief valves to release excessive pressure buildup within the tubing system.

4. The collector defined in claims 1 or 2, wherein the second layer of looped tubing is placed over the first layer in transverse position, said layers of tubing secured in position by a double strap plates crossing at 90 degrees angle, either attached to the bottom side or inner walls of the collector.

5. An air heating assembly defined in claim 1 wherein the outer and inner walls formed a space for passage of air stream coming from air return duct, the said space is provided with U-shape bent plates arranged in staggered spacing, attached to the inside faces of the inner and outer walls of said assembly, wherein the said plates act as a stiffener of the assembly's walls and as a heat absorbent and intensifier in the transfer of heat to the air stream flowing through said assembly.

6. A structure defined in claims 1 or 5, wherein a blocking wall on one side of the assembly's wall is placed to ensure complete U-turn of the air stream flowing through said assembly, the same wall the exterior face of which two stubbed ducts are attached to receive connecting ducts coming from air return and hot air supply ducts, and said connecting ducts are provided with swing type shutter to prevent back flow of air stream.

7. A structure defined in claim 1 comprising of two compartments, the primary and the secondary, wherein the primary compartment houses the piled rocks or bricks, the solar heat collector, the air heating assembly and the major coil of water conduit, whereas the secondary compartment is for preheating the air stream flowing through air return ducts and the coil of water conduit housed within the said compartment.

8. A structure defined in claims 1 or 7 wherein the spaces between the double walls of the compartments are filled with porous fiber insulation, the inside face of the inner wall is separated from the vertical and horizontal supporting members by a layer of non-combustible strip.

9. A structure defined in claims 1 or 7 wherein a blanket of fiber insulation is laid around the outer surface of the primary compartment's inner wall, said fiber insulation is protected by netted metal wire attached to conveniently spaced vertical bars.

10. A structure defined in claims 1 or 7, wherein the bottom side, a layer of compacted clay soil is laid, above which is a heavy gage metal sheet which directly supports the piled rocks or bricks.

11. A structure defined in claims 1 or 7, wherein the secondary compartment is provided with an air tight shutter, said shutter is hinge connected and formed by double walls, the space between walls filled with porous insulation.

* * * * *